(12) United States Patent
Wang et al.

(10) Patent No.: US 10,234,872 B2
(45) Date of Patent: Mar. 19, 2019

(54) METHOD AND APPARATUS FOR LAUNCHING UNMANNED AERIAL VEHICLE AND UNMANNED AERIAL VEHICLE INCORPORATING THE SAME

(71) Applicant: ZEROTECH (Chongqing) Intelligence Technology Co., Ltd., Chongqing (CN)

(72) Inventors: Shuaiqin Wang, Beijing (CN); Xiongwei Zhu, Beijing (CN); Yiqiang Zheng, Beijing (CN)

(73) Assignee: ZEROTECH (CHONGQING) INTELLIGENCE TECHNC, Longxing Town, Yubei District, Chongqing (CN)

( * ) Notice: Subject to any disclaimer, the term of this patent is extended or adjusted under 35 U.S.C. 154(b) by 162 days.

(21) Appl. No.: 15/390,750

(22) Filed: Dec. 27, 2016

(65) Prior Publication Data

US 2018/0067498 A1 Mar. 8, 2018

(30) Foreign Application Priority Data

Sep. 5, 2016 (CN) .......................... 2016 1 0802256

(51) Int. Cl.
*G06F 19/00* (2018.01)
*G05D 1/04* (2006.01)
*B64C 39/02* (2006.01)
*G05D 1/00* (2006.01)
*G05D 1/06* (2006.01)

(52) U.S. Cl.
CPC ........... *G05D 1/042* (2013.01); *B64C 39/024* (2013.01); *G05D 1/0011* (2013.01); *G05D 1/0669* (2013.01); *B64C 2201/027* (2013.01); *B64C 2201/08* (2013.01)

(58) Field of Classification Search
CPC . B64C 2201/08; B64C 39/024; G05D 1/0011; G05D 1/042
See application file for complete search history.

(56) References Cited

U.S. PATENT DOCUMENTS

| | | | |
|---|---|---|---|
| 9,376,208 B1 * | 6/2016 | Gentry | B64C 39/024 |
| 9,409,642 B1 * | 8/2016 | Pingree | B64C 11/28 |
| 9,540,101 B2 * | 1/2017 | Paduano | B64C 13/16 |
| 2006/0158143 A1 * | 7/2006 | Okita | G05B 19/358 |
| | | | 318/276 |
| 2009/0045283 A1 * | 2/2009 | Renshaw | B64F 1/224 |
| | | | 244/50 |
| 2009/0224097 A1 * | 9/2009 | Kariv | B64F 1/02 |
| | | | 244/63 |
| 2012/0248259 A1 * | 10/2012 | Page | B64C 29/02 |
| | | | 244/7 A |

(Continued)

OTHER PUBLICATIONS

The extended European search report for EP17153182.5.

*Primary Examiner* — Khoi H Tran
*Assistant Examiner* — Jorge O Peche
(74) *Attorney, Agent, or Firm* — Jun He Law Offices P.C.; James J. Zhu

(57) ABSTRACT

A method for launching an unmanned aerial vehicle (UAV) comprises: receiving a pre-launching signal; detecting, via at least one sensor of the UAV, at least one status parameter of the UAV in response to receiving the pre-launching signal; determining a launching mode of the UAV according to the at least one detected status parameter of the UAV; and launching the UAV according to the determined launching mode of the UAV.

14 Claims, 6 Drawing Sheets

(56) References Cited

U.S. PATENT DOCUMENTS

| | | | |
|---|---|---|---|
| 2014/0061377 A1* | 3/2014 | Smith | B64C 3/10 244/63 |
| 2014/0252162 A1* | 9/2014 | Teller | B64F 1/10 244/63 |
| 2014/0332620 A1* | 11/2014 | Earon | B64C 39/024 244/13 |
| 2014/0334668 A1* | 11/2014 | Saund | G06T 7/20 382/103 |
| 2014/0336848 A1* | 11/2014 | Saund | G08G 1/054 701/3 |
| 2015/0323932 A1* | 11/2015 | Paduano | G05D 1/042 701/3 |
| 2015/0360797 A1* | 12/2015 | Melish | B64F 1/025 |
| 2016/0091894 A1* | 3/2016 | Zhang | B64C 39/024 701/2 |
| 2016/0101856 A1* | 4/2016 | Kohstall | G05D 1/101 244/17.13 |
| 2016/0110649 A1* | 4/2016 | Dong | G06F 17/30528 706/11 |
| 2016/0137304 A1* | 5/2016 | Phan | B64D 27/02 244/17.23 |
| 2016/0169680 A1* | 6/2016 | Lee | G01C 21/16 702/151 |
| 2016/0185454 A1* | 6/2016 | Hutson | B64C 39/024 244/17.23 |
| 2016/0246304 A1* | 8/2016 | Canoy | G05D 1/0816 |
| 2016/0251088 A1* | 9/2016 | Melish | B64F 1/02 244/110 C |
| 2016/0327945 A1* | 11/2016 | Davidson | G05D 1/0027 |
| 2017/0028252 A1* | 2/2017 | Ito | A63B 69/36 |
| 2017/0197731 A1* | 7/2017 | Yang | B64F 1/04 |
| 2017/0248969 A1* | 8/2017 | Ham | B64C 39/024 |
| 2017/0328513 A1* | 11/2017 | Davis | F16M 11/046 |
| 2017/0328678 A1* | 11/2017 | Burke | F41G 3/04 |
| 2017/0328683 A1* | 11/2017 | Smith | F41G 7/2233 |
| 2018/0120127 A1* | 5/2018 | Kotwal | G01C 25/005 |

* cited by examiner

METHOD AND APPARATUS FOR LAUNCHING UNMANNED AERIAL VEHICLE AND UNMANNED AERIAL VEHICLE INCORPORATING THE SAME

CROSS REFERENCE TO RELATED APPLICATIONS

This application claims priority to Chinese Patent Application No. 201610802256.3 filed on Sep. 5, 2016, the entire content of which is incorporated herein by reference.

TECHNICAL FIELD

The present application relates generally to unmanned aerial vehicles, and more particularly to methods and apparatuses for launching unmanned aerial vehicles (UAVs).

BACKGROUND

People usually operate UAVs such as multi-rotor UAVs using remote consoles. Typically, when a UAV operator wants to launch a UAV, he or she may need to place the UAV on the ground, and then operate a remote console to launch the UAV into the air. Alternatively, some UAV operators may prefer to launch the UAV from their hands, because it is relatively easy to control the orientation, attitude or some other aspects of the UAV if it can be held by hands. However, the requirements on UAV operation under such two different launching conditions are significantly different.

Thus, there is a need for further improvement for UAV launching methods.

SUMMARY

An objective of the present application is to provide a UAV capable of automatically selecting an appropriate launching mode according to an environment where it resides.

In a first aspect of the present application, there is disclosed a method for launching an unmanned aerial vehicle (UAV), comprising: receiving a pre-launching signal; detecting, via at least one sensor of the UAV, at least one status parameter of the UAV in response to receiving the pre-launching signal; determining a launching mode of the UAV according to the at least one detected status parameter of the UAV; and launching the UAV according to the determined launching mode of the UAV.

In a second aspect of the present application, there is disclosed an apparatus for launching an unmanned aerial vehicle (UAV), wherein the UAV comprises a plurality of rotors, and the apparatus comprises: a receiver for receiving a pre-launching signal; at least one sensor for detecting at least one status parameter of the UAV in response to receiving the pre-launching signal; and a processor for determining a launching mode of the UAV according to the at least one detected status parameter of the UAV, and controlling the plurality of rotors to rotate according to the determined launching mode of the UAV, so as to launch the UAV In a third aspect of the present application, there is disclosed a UAV, comprising: a plurality of rotors; a receiver for receiving a pre-launching signal; at least one sensor for detecting at least one status parameter of the UAV in response to receiving the pre-launching signal; and a processor for determining a launching mode of the UAV according to the at least one detected status parameter of the UAV, and controlling the plurality of rotors to rotate according to the determined launching mode of the UAV, so as to launch the UAV.

The foregoing has outlined, rather broadly, features of the present application. Additional features of the present application will be described, hereinafter, which form the subject of the claims of the present application. It should be appreciated by those skilled in the art that the conception and specific embodiments disclosed herein may be readily utilized as a basis for modifying or designing other structures or processes for carrying out the objectives of the present application. It should also be realized by those skilled in the art that such equivalent constructions do not depart from the spirit and scope of the present application as set forth in the appended claims.

BRIEF DESCRIPTION OF THE DRAWINGS

The aforementioned features and other features of the present application will be further described in the following paragraphs by referring to the accompanying drawings and the appended claims. It will be understood that, these accompanying drawings merely illustrate certain embodiments in accordance with the present application and should not be considered as limitation to the scope of the present application. Unless otherwise specified, the accompanying drawings need not be proportional, and similar reference characters generally denote similar elements.

DETAILED DESCRIPTION OF THE PREFERRED EMBODIMENTS

The following detailed description refers to the accompanying drawings as a part of the present application. Unless otherwise stated in the context, similar symbols generally represent similar components in the accompanying figures. The illustrative embodiments described in the detailed description, the accompanying drawings and the claims are not limiting, and other embodiments may be adopted, or modifications may be made without deviating from the spirit and subject of the present application. It should be understood that, the various aspects of the present application described and graphically presented herein may be arranged, replaced, combined, divided and designed in many different configurations, and these different configurations are implicitly included in the present application.

Figure 1:
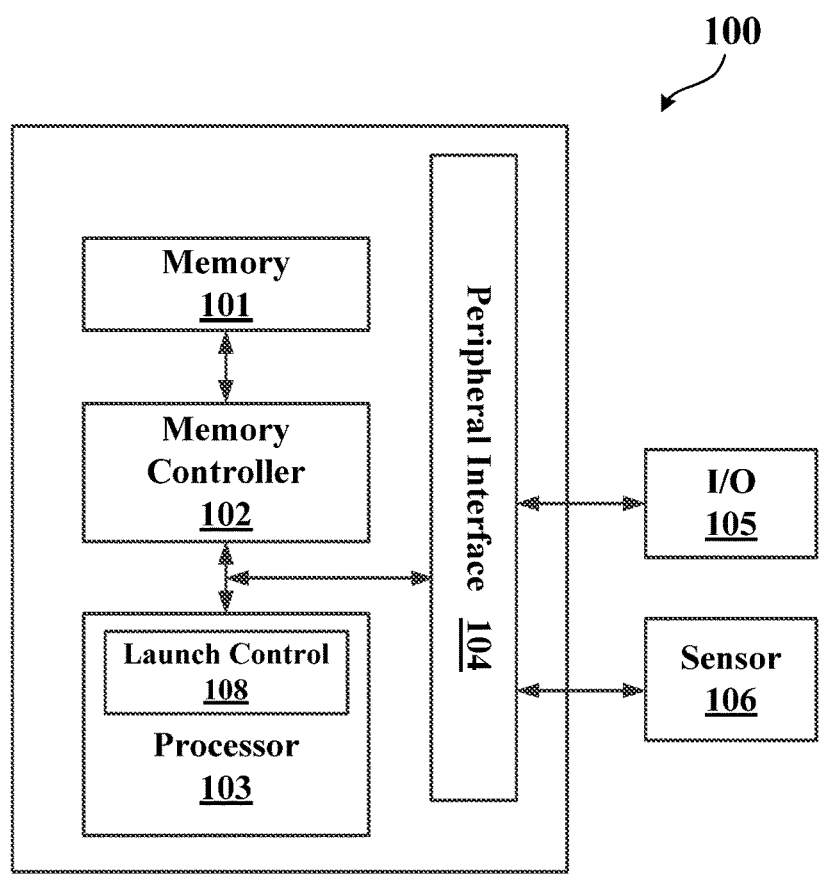
FIG. 1 shows a block diagram of a UAV 100 according to an embodiment of the present application.

FIG. 1 shows a block diagram of a UAV 100 according to an embodiment of the present application.

The UAV 100 generally has a plurality of rotors (not shown) that rotate to drive the flight of the UAV 100 in a desired direction and at a desired motion speed. The UAV 100 may be in wireless communication with a remote console (not shown), which may be operated by a UAV operator. For example, a receiver or transceiver may be carried on the UAV 100 for the wireless communication with the remote console or any other suitable remote devices. With the remote console, the UAV operator may give various control instructions to control the flight and other actions of the UAV before, during or after the launching of the UAV 100.

As shown in FIG. 1, the UAV 100 includes a memory 101 for storing a software or instructions relating to the launching, flight, image capturing and/or other operation of the UAV. A processor 103 is coupled to the memory 101 via a memory controller 102. Through the memory controller 102, data and instructions can be read from or written into the memory 101 by the processor 103 for the UAV operation. The UAV 100 further includes an input/output assembly 105, which is coupled to the memory 101 and the processor 103 via a peripheral interface 104. The input/output assembly 105 is used for receiving user inputs from the UAV operator and/or outputting data or signals indicating the operation or other aspects of the UAV 100. For example, the input/output assembly 105 may include a keyboard, a touch pad, a touch screen, a set of buttons, an image capturing device, a sound control device, a display, an accelerometer, and a speaker, for example.

A sensor assembly 106 for detecting at least one status parameter of the UAV 100 is also coupled to the peripheral interface 104. For example, the sensor assembly 106 may include at least one of the following sensors such as an accelerometer, a velocity meter, an ultrasound transducer, an infrared sensor, an optical sensor, a barometer, a positioning sensor, a radio-frequency system, a gyro sensor, a multi-antenna system or any other suitable status detecting sensors. In certain embodiments, the sensor assembly 106 may be a combination of various types of the foregoing sensors. The status parameters of the UAV 100 may include, without limitation, a position, velocity, speed, acceleration or orientation of the UAV 100, or a change in position, velocity, speed, acceleration or orientation of the UAV 100. Further, some status parameters of the UAV 100 may be processed by the processor 103 or any other signal or data processing components. For example, the processor 103 may calculate the speed, velocity or position of the UAV 100 using the detected acceleration of the UAV 100 over a period of time, or vice versa.

The UAV 100 also includes a launch control module 108, which is used to control the launching the UAV 100. In the embodiment shown in FIG. 1, the launch control module 108 is integrated within the processor 103, and in an alternative embodiment, the launch control module 108 may be a component separate from the processor 103. The launch control module 108 may be in form of software, firmware, hardwire or combination thereof, which can be integrated within the processor 103. In some preferred embodiments, the launch control module 108 may be a software program containing control instructions executable by the processor 103.

Figure 2:
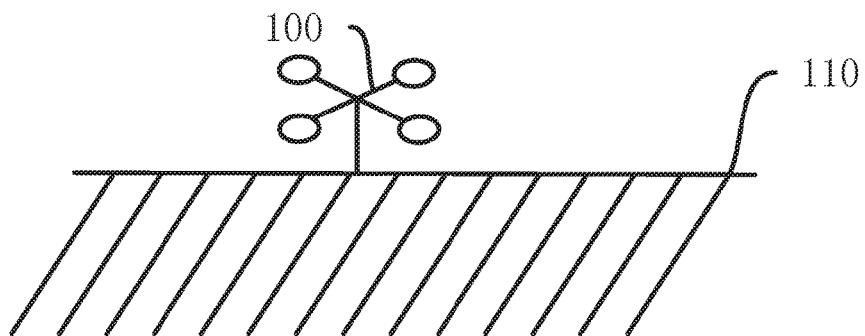
FIG. 2 shows the UAV being placed on the ground.

In some conditions, the UAV 100 may be placed on the ground or other similar stationary objects such as a table or a platform 110, as shown in FIG. 2. These places or objects cannot move relative to the UAV 100 actively, and thus they can provide firm and stable support for the UAV 100 when the UAV 100 is launching.

Figure 3:
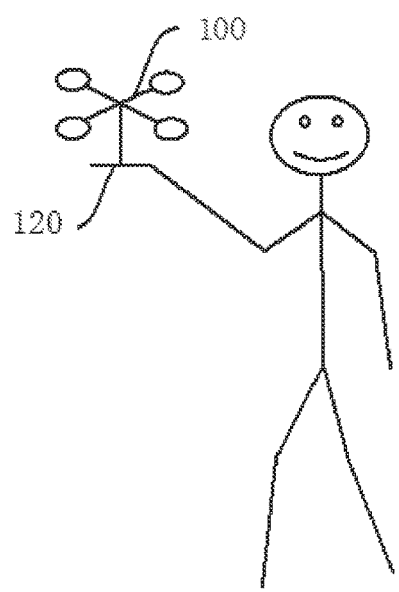
FIG. 3 shows the UAV being held in hands of a UAV operator.

As shown in FIG. 3, in some other conditions, however, the UAV 100 may be held in the hands 120 of the UAV operator, or in or on some handheld platforms controlled by the UAV operator. The hands or handheld platforms can move relative to the UAV 100 actively, which thus cannot provide static/stable support for the UAV 100. Thus, it is beneficial for the UAV 100 to distinguish these two conditions and operate differently according to the identified condition.

Figure 4:
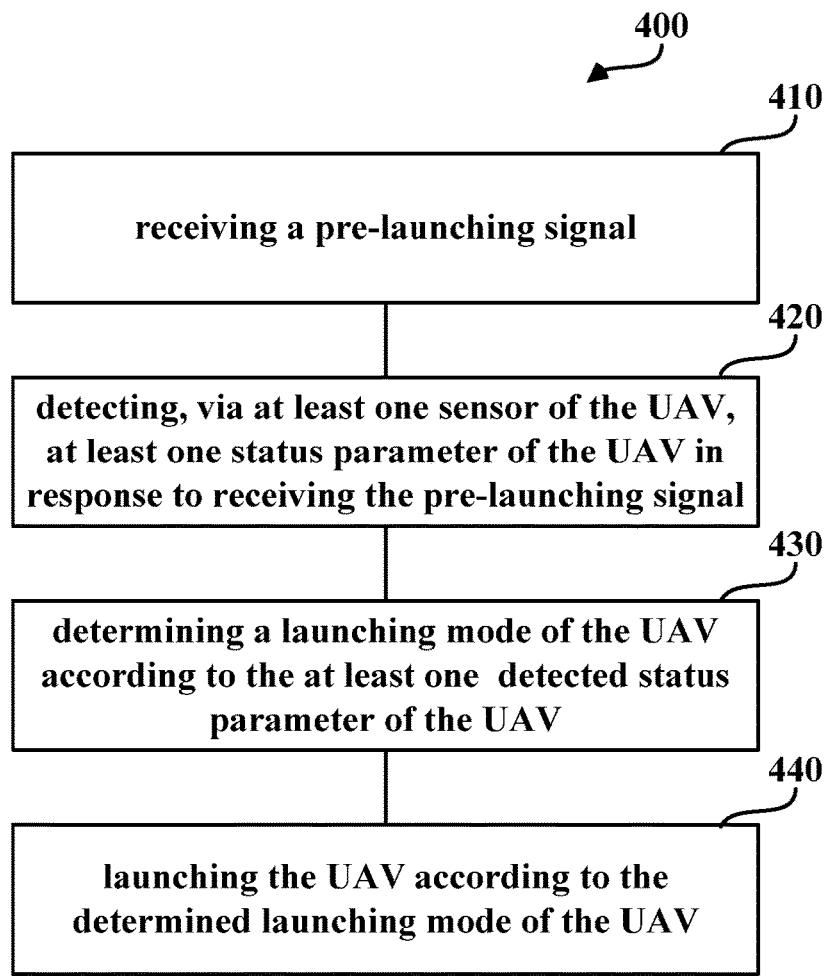
FIG. 4 shows a flow chart of a method 400 for launching a UAV according to an embodiment of the present application.

FIG. 4 shows a flow chart of a method 400 for launching a UAV according to an embodiment of the present application. The method 400 can be implemented by the UAV shown in FIG. 1 or any other suitable UAVs.

As shown in FIG. 4, the method 400 starts with Step 410, a pre-launching signal is received by the UAV.

In an example, the UAV may be placed on the ground and receive the pre-launching signal from a remote device wirelessly coupled to the UAV and controlled by the UAV operator. In another example, the UAV may be held by the UAV operator and receive through its input/output assembly the pre-launching signal input by the UAV operator. In yet another example, the UAV may sense vibration or shaking of itself through an accelerometer carried thereon, and generate the pre-launching signal if a predetermined condition is satisfied. The vibration or shaking of the UAV may be resulted from a user action such as a hand action, and may cause pulses of acceleration of an amplitude greater than 1 g (i.e. gravitational acceleration which is 9.8 m/s$^2$), or preferably greater than 2.5 g. If the pulses of acceleration have been detected for a predetermined number of times within a predetermined period (such as 1 to 5 seconds), then the UAV may determine that the pre-launching signal has been received. It should be noted that the above generating and receiving of the pre-launching signal is exemplary only and does not intend to limit the scope of the present application.

In response to receiving the pre-launching signal, the UAV is activated into a pre-launching mode. Specifically, the pre-launching mode is an operation mode where certain components of the UAV are activated or enabled to be ready for a launching action of the UAV. For example, when the UAV is in the pre-launching mode, its processor and sensors are powered on and thus activated. However, certain other components of the UAV such as the rotors may not be activated yet in the pre-launching mode.

In some embodiments, the UAV will not enter into the pre-launching mode immediately after receiving the pre-launching signal. Rather, the UAV may wait for a predetermined preparation time and then enter into the pre-launching mode. The preparation time, which may be 1 second to 5 seconds, or preferably 2 seconds, allows the UAV operator to perform some additional operations or adjustments to the UAV. In particular, during the preparation time, the UAV operator can place the UAV on the ground or on a stationary platform, or move his or her hands or handheld platform to adjust the height, orientation or position of the UAV. For example, in case that the UAV operator taps on the UAV to generate the pre-launching signal in Step 410, the location of the UAV when the UAV operator is tapping may not be a desired launching location, and then the UAV operator may further move the UAV to a new location during the preparation time. In some embodiments, the UAV may include a timer, either in form of hardware or software, to count or countdown the preparation time. In some embodiments, the UAV may include an indicator for notifying that the UAV will enter into the pre-launching mode, or enter into other operation modes. Such indicator may be either in visible form or in audible form, e.g. a speaker or an LED lamp.

In some embodiments, the UAV may perform self-check on its operation status, to detect and identify potential failures that may affect the normal flight or launch of the UAV. If it finds any failure of the UAV or any status indicating that UAV is not ready for launching yet, then the UAV may not enter into the pre-launching mode. Optionally, the UAV may provide the self-check result to the UAV operator, for example, by illuminating corresponding LED indicators or sending the self-test result to the remote device of the UAV operator. Aspects or parameters of the UAV for the self-check may include a power-on or initialization time, operation status of the rotors, whether the UAV is within a no-fly zone, whether the sensors are valid, whether the UAV is moving or static, whether certain parameters such as the motion speed, acceleration or displacement of the UAV are within a predetermined range, etc. In an example, the UAV may determine whether the UAV is static during the self-check, by comparing the motion speed of the UAV with a speed threshold. If the motion speed is greater than the speed threshold, then it is determined that the UAV is not static, and thus the self-check may prevent UAV from entering into a pre-launching mode. In practice, it is important to keep the UAV relatively static before launching it, otherwise a big speed variation may make the UAV out of control during or after the launching process.

Figure 5A:
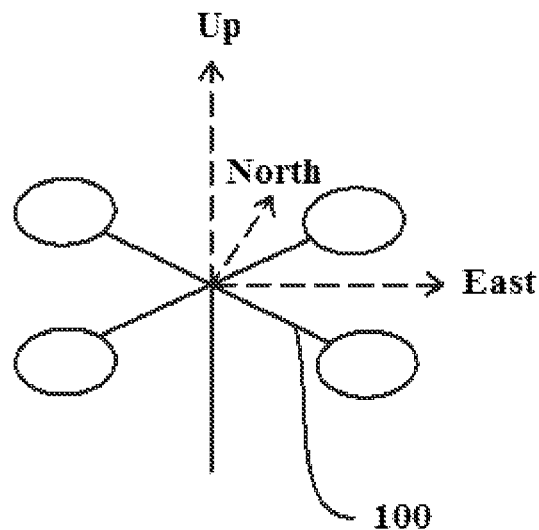
FIGS. 5a and 5b show two examples of motion speed detection of the UAV along three orthogonal axes in an absolute coordinate system.
Figure 5B:
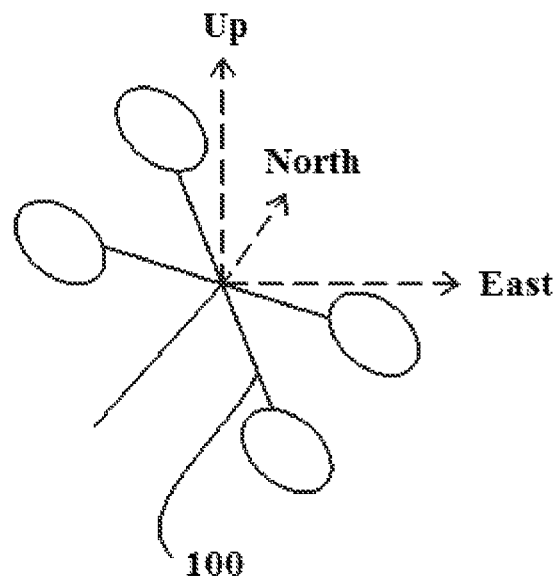

FIGS. 5a and 5b show two examples of motion speed detection of the UAV along three orthogonal axes. In the examples shown in FIGS. 5a and 5b, the motion speed of the UAV is detected in an absolute coordinate system, such as the ground coordinate system. Thus, the detected motion speed does not change with the attitude of the UAV. In some examples, the motion speed of the UAV may be decomposed into three components in an upward/downward direction, in a northward/southward direction and in a westward/eastward direction, respectively, as shown in FIGS. 5a and 5b. In some examples, each direction may be provided with a speed threshold for determination of the status of the UAV. If a motion speed component in any of the above three directions exceeds the corresponding speed threshold, then it may be determined that the UAV is not static. For example, a first speed threshold in the westward/eastward direction may be set as 0.3 m/s, a second speed threshold in the northward/southward direction may be set as 0.3 m/s, and a third speed threshold in the upward/downward direction may be set as 0.2 m/s. If it is detected that the UAV flies eastward at a motion speed of 0.4 m/s, which is greater than the first speed threshold 0.3 m/s, then it is determined that the UAV is not static.

Next, in response to receiving the pre-launching signal, in Step 420, the UAV enters into the pre-launching mode and detects, via at least a portion of its sensor assembly, at least one status parameter of the UAV.

In some embodiments, the status parameter may include the acceleration of the UAV, which can reflect clearly whether the UAV is placed on a stationary platform or on a mobile platform. Specifically, if the UAV is placed on the stationary platform, it may not move and thus its acceleration should be zero or very close to zero. However, if the UAV is held on the mobile platform like the hands of the UAV operator, the UAV may slightly shake due to the physiology of the human body, and thus its acceleration should be of a non-zero value. As a result, an acceleration threshold may be provided for comparison with the detected acceleration of the UAV so as to determine the status of the UAV. The specific values of the acceleration threshold may be determined according to empirical values or practical requirements. For example, the acceleration threshold may range from 0.005 g to 0.05 g. It will readily appreciated that other status parameters of the UAV may alternatively be used to determine the status of the UAV, for example, the position, displacement or motion speed of the UAV may also be used in some examples.

After the status parameter of the UAV has been detected, in Step 430, the UAV may determine its launching mode according to the detected status parameter.

Specifically, the UAV may be launched in different ways depending on its status, especially the environment where the UAV resides.

If the UAV is placed on the ground or other stationary platform, the UAV can be launched in a ground launching mode. In the ground launching mode, the rotors of the UAV rotate to generate a lifting force sufficient to lift the UAV upward and off the ground or the stationary platform.

Furthermore, if the UAV is placed on the mobile platform, the UAV can be launched in a hand launching mode. In the hand launching mode, the mobile platform may help releasing the UAV into the air, and the UAV should be capable of automatically adjusting a rotary speed of the rotors after being released, so as to maintain its position or height stable and not fall down.

In some embodiments, the UAV may determine its launching mode by comparing the status parameter detected in Step 420 with a predetermined threshold value. For example, in case that the status parameter is the acceleration of the UAV, then it can be compared with a predetermined acceleration threshold. Specifically, if the acceleration of the UAV is smaller than or equal to the acceleration threshold, then it can be determined that the UAV is placed on the ground or other stationary platform, and accordingly the launching mode of the UAV is determined as the ground launching mode. However, if the acceleration of the UAV is greater than the acceleration threshold, then it can be determined that the UAV is held by the mobile platform, and accordingly, the launching mode is determined as the hand launching mode.

Figure 6A:
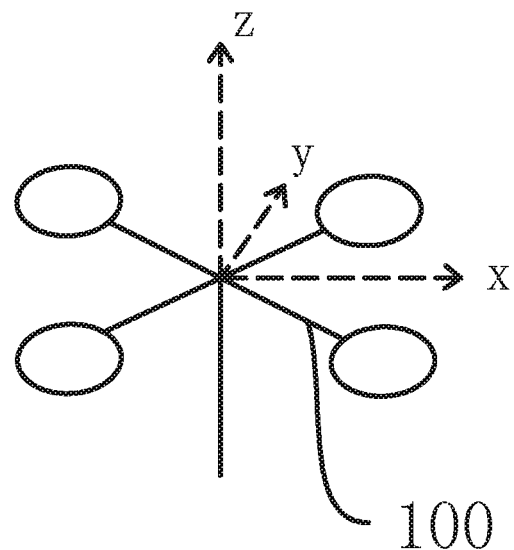
FIGS. 6a and 6b show two examples of acceleration detection of the UAV along three orthogonal axes in a local coordinate system.
Figure 6B:
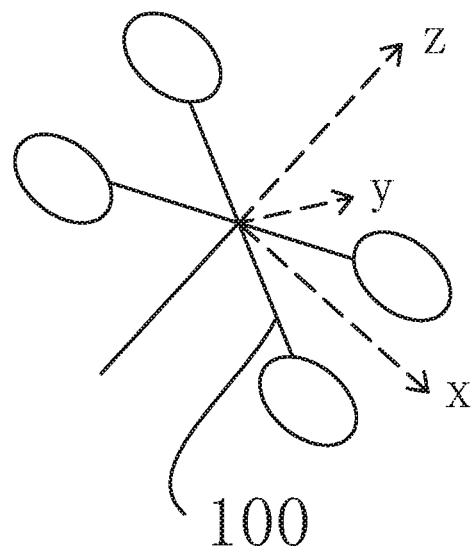

In an example, the acceleration comparison may include obtaining three components of the acceleration of the UAV which are detected along three orthogonal axes, such as axes x, y and z shown in FIGS. 6a and 6b. The three orthogonal axes x, y and z are all relative to the UAV itself, i.e. constitute a local coordinate system for the UAV. For example, a three-axis accelerometer can be used to detect the acceleration of the UAV, and the three orthogonal axes may correspond to three detection axes of the three-axis accelerometer. Any instantaneous values of the three acceleration components of the UAV within a period may be compared with the acceleration threshold to determine the launching mode. Alternatively, the three acceleration components of the UAV over a period, e.g. a period of 50 ms or less, may be processed respectively to obtain three average values. Any of the three average values can be compared with the acceleration threshold. Or, all the three average values can be compared with the same acceleration threshold or three respective acceleration thresholds. If any average value for the acceleration component of the UAV exceeds the corresponding acceleration threshold, which indicates that the movement of the UAV is apparent, then the UAV may determine the launching mode as the hand launching mode.

In another example, the acceleration comparison may further include calculating a sum or other statistical value of the three average values corresponding to acceleration components of the UAV, and accordingly, the sum or statistical value of the three average values may be further compared with a corresponding acceleration threshold to determine the launching mode of the UAV. It can be appreciated that the acceleration threshold for comparison with the sum or other statistical value may be different from the acceleration threshold for comparison with an instantaneous value or an average value of an acceleration component.

In some embodiments, the UAV may use a mode flag to represent its launching mode, such that the ground launching mode and the hand launching mode can be identified by the UAV using different values of the mode flag. For example, the mode flag of a value "1" may represent the hand launching mode, and the mode flag of a value "0" may represent the ground launching mode. The value of the mode flag may be set or updated when the launching mode of the UAV has been determined according to the detected status parameter of the UAV in Step 430, and may be further stored within the memory of the UAV or cached in the processor or other components of the UAV.

Next, in Step 440, the UAV is launched according to the launching mode determined in Step 430.

In an embodiment, the UAV may check the mode flag and identify the value of the mode flag, and then it may enter into the launching mode represented by the identified value of the mode flag. For example, if the UAV identifies that the value of the mode flag is "0", then it may select the ground launching mode. If the value of the mode flag is identified as "1", then the UAV may select the hand launching mode.

After determination of the specific launching mode, the UAV may receive a launching signal which may be sent from the remote device or input through the input/output assembly of the UAV. In some embodiments, the launching signal may be automatically generated when a predetermined condition is satisfied. The predetermined condition may be, for example, that a predetermined period (e.g., 1~2 seconds) has lapsed after the UAV receives the pre-launching signal or after the UAV enters into the pre-launching mode, or any other suitable conditions.

If the launching mode of the UAV is the ground launching mode, then in response to receiving the launching signal, the UAV increases a rotary speed of its rotors at a constant rate. The constant rate may be determined or given by the UAV operator according to practical requirements. A lifting force generated from the rotation of the rotors increases as the rotary speed of the rotors increases. When the lifting force substantially exceeds the gravity of the UAV, the UAV may gradually take off from the ground or the stationary platform and fly into the air. When the rotary speed of the rotors of the UAV increases, the UAV can also detect certain aspects of its status, such as the height, the motion speed, the position or any other suitable status parameters. If a predetermined condition is satisfied, the UAV may stop increasing the rotary speed of the rotors, and optionally record the height of the UAV. The predetermined condition may be, for example, that the UAV is higher than a predetermined upper threshold height (e.g. 1.0 m above the ground or to the stationary platform) or a first predetermined period has lapsed (e.g. 5 to 30 seconds) since the receipt of the launching signal. For example, if the UAV flies higher than the predetermined upper threshold height, then the UAV may stop increasing the rotary speed of the rotors. The UAV may then wait for further control instructions from the UAV operator, e.g. an instruction for tracking a specific object.

In some examples, after increasing the rotary speed at the constant rate, the UAV may further adjust the rotary speed of the rotors so as to keep itself hovering in the air. For example, the rotary speed of the UAV may be too fast that the UAV keeps flying upward and may thus be out of control, or the rotary speed of the UAV may be too slow that the UAV gradually moves downward and return to the ground. Consequently, the UAV may detect its height in real time and adjust the rotary speed of the rotors according to the detected height. If the detected height is high, then the UAV may decrease the rotary speed of the rotors, but if the detected height is low, then the UAV may increase the rotary speed of the rotors to fly upward.

Figure 7:
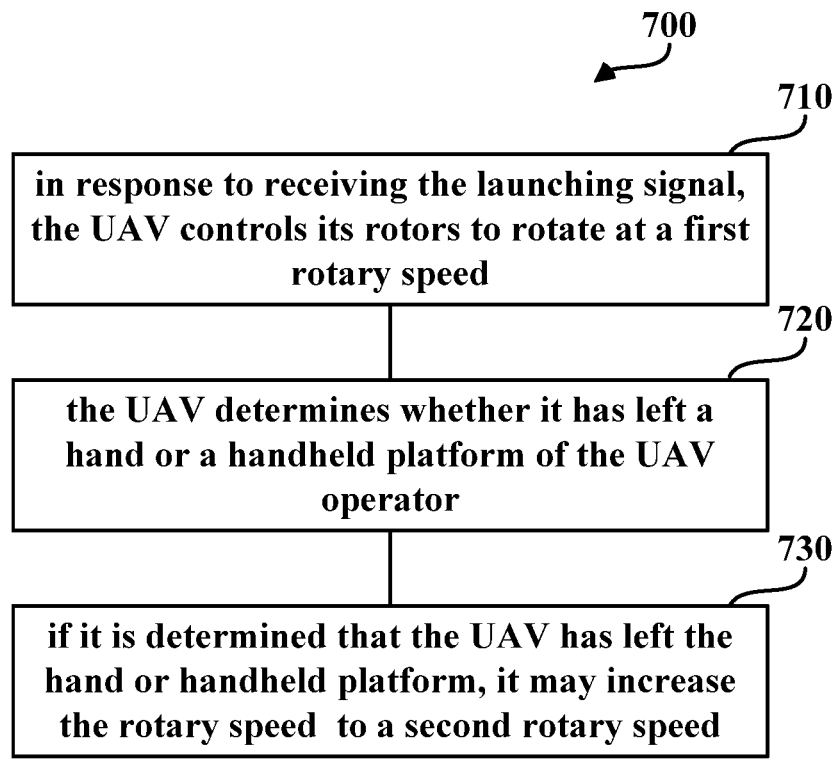
FIG. 7 shows a process for launching the UAV in a hand launching mode.

If the launching mode of the UAV is the hand launching mode, the UAV may operate according to a process 700 shown in FIG. 7.

As shown in FIG. 7, the process starts with Step 710, in response to receiving the launching signal, the UAV controls its rotors to rotate at a first rotary speed. The first rotary speed is relatively small and insufficient for launching the UAV, e.g. smaller than a rotary speed for launching the UAV. In other words, the rotation of the rotors at the first rotary speed cannot generate a lifting force greater than the gravity of the UAV, such that the UAV cannot take off from the mobile platform. The first rotary speed is generally a safe rotary speed that will not hurt the UAV operator even if the UAV operator touches the rotating discs/wings of the rotors. Also, the UAV operator may be aware of the rotation of the rotors, and be fully prepared for subsequent high-speed rotation of the rotors.

Moreover, optionally, the function and operation of the rotors and its control system can also be checked in Step 710.

In some embodiments, the first rotary speed may be smaller than a rated rotary speed of the rotors which can maintain a vertical motion speed of the UAV substantially equal to zero in an ideal condition. In an example, the first rotary speed may be 10 to 90 percent of the rated rotary speed. In practice, the rated rotary speed may be determined through several experimental flights of the UAV. For example, the UAV may be instructed to hover during its flight, and the rotary speed of the rotors that maintains the hovering of the UAV may be recorded as the rated rotary speed.

Next, in Step 720, the UAV determines whether it has left a hand or a handheld platform of the UAV operator.

Specifically, after receiving the launching signal, the UAV may detect its motion speed or preferably its vertical motion speed. The detected motion speed or vertical motion speed may be an average value over a period, or a maximum value within a period (e.g. 2 or 3 seconds from the receipt of the pre-launching signal or the launching signal), or a number of sampled values. In some examples, an accelerometer, a positioning sensor (e.g. GPS sensor), an ultrasound sensor, a barometer or any other suitable sensors can be used to detect the motion speed or vertical motion speed of the UAV or relevant status parameter (e.g. position, height or acceleration) of the UAV. Accordingly, the UAV may determine whether it leaves the hand or handheld base/platform by comparing the detected vertical motion speed with a first threshold motion speed. In some embodiments, the first threshold motion speed may be 0.1 to 1.0 m/s and preferably 0.3 m/s. If the vertical motion speed is greater than or equal to the first threshold motion speed, it indicates that the UAV leaves the hand or handheld platform. In particular, if the hand or handheld platform is removed from the bottom of UAV, a supporting force previously provided to the UAV would disappear in a sudden and the UAV may fall, resulting in a downward movement of the UAV. Similarly, if the hand or handheld platform lifts the UAV upward and then is removed from the bottom of the UAV (e.g. throw the UAV into the air), the UAV may continue to move upward further. Thus, the vertical motion speed of the UAV can reflect whether the UAV leaves the hand or handheld platform.

In some other embodiments, the UAV can compare other status parameters of the UAV, such as the position, height or acceleration of the UAV, with respective threshold values, to determine whether the UAV leaves the hand or the handheld platform of the UAV operator, because these status parameters may significantly change at the time the UAV leaves the hand or handheld platform.

Next, in Step 730, if it is determined that the UAV has left the hand or handheld platform, then the UAV may increase the rotary speed of the rotors to a second rotary speed. The second rotary speed is greater than the first rotary speed and substantially allows the UAV to hover in the air. For example, the second rotary speed may be the rated rotary speed of the UAV In some cases, the surrounding conditions (e.g. the altitude, the air pressure, the wind speed, etc.) of the UAV, the weight and mechanical structure of the UAV, the propelling ability of the rotors of the UAV and many other factors may result in that the rotary speed which allows stable hovering of the UAV is different from the rated rotary speed. Consequently, the UAV may move upward or downward if the rotary speed of its rotors does not change. Under such condition, after Step 730, the UAV may further detect its motion speed, and adjust the rotary speed of the rotors according to the detected motion speed, such that the vertical motion speed of the UAV substantially approaches to zero, i.e. the UAV can hover in the air. For example, if the vertical motion speed of the UAV is upward, then the rotary speed of the rotors may decrease. Moreover, if the vertical motion speed of the UAV is downward, then the rotary speed of the rotors may increase.

After the above steps, if the vertical motion speed of the UAV is smaller than a second threshold motion speed, which indicates that the UAV substantially hovers in the air and does not move, then the UAV may stop its launching process. For example, the vertical motion speed may be an instantaneous value or an average value over a period (e.g. 50 ms or less), and the second threshold motion speed may be 0.05 m/s or less.

When the launching process stops, the UAV may adjust its operation dynamically, such that it can hover at a height at which the UAV is located when the launching process stops. In this way, the UAV may further receive subsequent control instruction from the UAV operator, to perform other operations such as tracking an object or capturing images.

In some conditions, the UAV may have a fast initial motion speed, for example, when the UAV operator throws the UAV up into the air at a fast speed. Under such condition, the UAV may not be able to adjust its motion speed close to zero in a short period, after the rotary speed of the UAV has been adjusted to the rated rotary speed. It is because the adjustment of the rotary speed during the launching process is slight. Thus, it may take a long time to launch the UAV.

Consequently, in another embodiment, the UAV may stop its launching process when the UAV is still moving at a fast speed but a predetermined period has lapsed after receipt of the pre-launching signal or the launching signal. The predetermined period may be 5 seconds or more, e.g. 6 seconds. Specifically, the UAV may detect its motion speed in the predetermined period, and determine that its motion speed has not decreased sufficiently when it finds that the detected motion speed is greater than the first threshold motion speed. The detected motion speed may include multiple sample values of the motion speed detected in the predetermined period, or multiple average values of the motion speed detected within multiple sub-periods of the predetermined period. In some examples, if the number of sample values of the motion speed which are smaller than the first threshold motion speed is less than a predetermined number, then it may be determined that the motion speed of the UAV is not decreased sufficiently. After the launching process stops, the UAV may further adjust the rotary speed of the rotors to let its motion speed decrease to zero much faster, and then the UAV can hover in the air in a short period.

Similarly, when the launching process stops after the predetermined period has lapsed, the UAV may record its height. Accordingly, the UAV may adjust its flight so that it can hover in the air at the recorded height, waiting for subsequent control instructions.

In some embodiments, some aspects of the status of the UAV may change accidentally, which indicates potential failures of the UAV. Accordingly, if such accidental change of the UAV status is detected, the UAV may stop its launching process as well. For example, the UAV may stop the launching process if the rotary speed of its rotors changes abruptly (e.g. when the UAV crashes into some objects), or if an angle of tilt of the UAV is abnormally greater than a threshold angle of title (e.g. 90 degrees relative to the vertical direction).

The application also provides an apparatus for launching a UAV. The UAV comprises a plurality of rotors, and the apparatus includes: a receiver for receiving a pre-launching signal; at least one sensor for detecting at least one status parameter of the UAV in response to receiving the pre-launching signal; and a processor for determining a launching mode of the UAV according to the at least one detected status parameter of the UAV, and controlling the plurality of rotors to rotate according to the determined launching mode of the UAV, so as to launch the UAV. The operation of the apparatus can be referred to the method embodiments described above, which will not be elaborated herein.

In some embodiments, the at least one status parameter of the UAV comprises an acceleration of the UAV, and the processor is further configured to perform: comparing the acceleration of the UAV with an acceleration threshold to determine the launching mode of the UAV In some embodiments, the processor is further configured to perform: obtaining three average values of the acceleration components of the UAV detected along three orthogonal axes within a period; and calculating a sum of the average values as a value of the acceleration of the UAV.

In some embodiments, the processor is further configured to perform: obtaining three average values of the acceleration components of the UAV detected along three orthogonal axes within a period; and using any of the three average values as a value of the acceleration of the UAV In some embodiments, the processor is further configured to perform: determining the launching mode of the UAV as a hand launching mode, if the acceleration of the UAV is greater than the acceleration threshold; or determining the launching mode of the UAV as a ground launching mode, if the acceleration of the UAV is smaller than or equal to the acceleration threshold.

In some embodiments, the processor is further configured to perform: setting a value of a mode flag representing the launching mode of the UAV; wherein the launching step further comprises: identifying the value of the mode flag; and launching the UAV in a launching mode represented by the identified value of the mode flag.

The apparatus for launching a UAV according the above embodiments can be integrated within the UAV.

The application also provides a UAV, comprising: a plurality of rotors; a receiver for receiving a pre-launching signal; at least one sensor for detecting at least one status parameter of the UAV, in response to receiving the pre-launching signal; and a processor for determining a launching mode of the UAV according to the at least one detected status parameter of the UAV, and controlling the plurality of rotors to rotate according to the determined launching mode of the UAV, so as to launch the UAV.

The embodiments of the present application may be implemented by hardware, software or any combination thereof. The hardware may be implemented by specific logic circuits, and the software may be stored in a memory and executed by appropriate instruction executing systems. For example, the software may be executed by a microprocessor or a specifically designed hardware. Those skilled in the art may understand that the previous method of the present application may be implemented by computer-executable instructions and/or control codes contained in the processor. For example, such codes may be provided in storage mediums such as hard disks, programmable memories such as ROM(s), or data mediums such as optical or electrical signal mediums.

Those skilled in the art may understand and implement other variations to the disclosed embodiments from a study of the drawings, the present application, and the appended claims. In the claims, the word "comprising" does not exclude other elements or steps, and the indefinite article "a" or "an" does not exclude a plurality. In applications according to present application, one element may perform functions of several technical feature recited in claims. Any reference signs in the claims should not be construed as limiting the scope. The scope and spirit of the present application is defined by the appended claims.

What is claimed is:

1. A method for launching an unmanned aerial vehicle (UAV), comprising:
   receiving a pre-launching signal;
   detecting, via at least one sensor of the UAV, at least one status parameter of the UAV in response to receiving the pre-launching signal;
   determining a launching mode of the UAV according to the at least one detected status parameter of the UAV; and
   launching the UAV according to the determined launching mode of the UAV,
   wherein the at least one status parameter of the UAV comprises an acceleration of the UAV, and the determining step further comprises: comparing the acceleration of the UAV with an acceleration threshold to determine the launching mode of the UAV,
   wherein the comparing step further comprises:
      determining the launching mode of the UAV as a hand launching mode, if the acceleration of the UAV is greater than the acceleration threshold; or
      determining the launching mode of the UAV as a ground launching mode, if the acceleration of the UAV is smaller than or equal to the acceleration threshold.

2. The method of claim 1, wherein prior to the determining step, the method further comprises:
   obtaining three average values of the acceleration components of the UAV detected along three orthogonal axes within a period; and
   calculating a sum of the average values as a value of the acceleration of the UAV.

3. The method of claim 1, wherein prior to the determining step, the method further comprises:
   obtaining three average values of the acceleration components of the UAV detected along three orthogonal axes within a period; and
   using any of the three average values as a value of the acceleration of the UAV.

4. The method of claim 1, wherein in the ground launching mode, the launching step comprises:
   receiving a launching signal;
   increasing a rotary speed of rotors of the UAV at a constant rate in response to receiving the launching signal; and
   stopping increasing the rotary speed of the rotors of the UAV when either of the following two conditions is met:
      the UAV is higher than a predetermined upper threshold height; or
      a first predetermined period has lapsed since the receipt of the launching signal.

5. The method of claim 1, wherein in the hand launching mode, the launching step comprises:
   receiving a launching signal;
   controlling rotors of the UAV to rotate at a first rotary speed in response to the receiving the launching signal, wherein the first rotary speed is smaller than a rotary speed used for launching the UAV;
   determining whether the UAV leaves a hand or a handheld platform of an operator of the UAV; and
   increasing the rotary speed of the rotors of the UAV to a second rotary speed if it is determined that the UAV leaves the hand or handheld platform of the operator of the UAV, wherein the second rotary speed is greater than the first rotary speed and substantially allows the UAV to hover in the air.

6. The method of claim 5, wherein the launching step further comprises:
   detecting a motion speed of the UAV;
   adjusting, after the increasing step, the rotary speed of the rotors according to the motion speed of the UAV, thereby a vertical motion speed of the UAV approaches to zero.

7. The method of claim 5, wherein the step of determining whether the UAV leaves a hand or handheld platform of an operator of the UAV comprises:
   comparing a vertical motion speed of the UAV with a first threshold motion speed; and
   determining that the UAV leaves the hand or handheld platform of the operator of the UAV if the vertical motion speed of the UAV is greater than or equal to the first threshold motion speed.

8. The method of claim 5, wherein subsequent to the launching step, the method further comprises:
   stopping launching the UAV, when any of the following conditions is met:
      a vertical motion speed of the UAV is smaller than a second threshold motion speed; or
      a second predetermined period has lapsed since the receipt of the launching signal; or
      the height of the UAV is higher than a predetermined upper threshold height.

9. The method of claim 8, further comprising:
   adjusting the operation of the UAV after launching the UAV, such that the UAV hovers at a height at which the UAV is positioned when the launching of the UAV stops.

10. The method of claim 1, wherein the determining step further comprises:

setting a value of a mode flag representing the launching mode of the UAV;
wherein the launching step further comprises:
identifying the value of the mode flag; and
launching the UAV in a launching mode represented by the identified value of the mode flag.

11. An apparatus for launching an unmanned aerial vehicle (UAV), wherein the UAV comprises a plurality of rotors, and the apparatus comprises:
a receiver for receiving a pre-launching signal;
at least one sensor for detecting at least one status parameter of the UAV in response to receiving the pre-launching signal; and
a processor for determining a launching mode of the UAV according to the at least one detected status parameter of the UAV, and controlling the plurality of rotors to rotate according to the determined launching mode of the UAV, so as to launch the UAV,
wherein the at least one status parameter of the UAV comprises an acceleration of the UAV, and the processor is further configured to perform: comparing the acceleration of the UAV with an acceleration threshold to determine the launching mode of the UAV,
wherein the processor is further configured to perform:
determining the launching mode of the UAV as a hand launching mode, if the acceleration of the UAV is greater than the acceleration threshold; or
determining the launching mode of the UAV as a ground launching mode, if the acceleration of the UAV is smaller than or equal to the acceleration threshold.

12. The apparatus of claim 11, wherein the processor is further configured to perform:
obtaining three average values of the acceleration components of the UAV detected along three orthogonal axes within a period; and
calculating a sum of the average values as a value of the acceleration of the UAV.

13. The apparatus of claim 11, wherein the processor is further configured to perform:
obtaining three average values of the acceleration components of the UAV detected along three orthogonal axes within a period; and
using any of the three average values as a value of the acceleration of the UAV.

14. An unmanned aerial vehicle (UAV), comprising:
a plurality of rotors;
a receiver for receiving a pre-launching signal;
at least one sensor for detecting at least one status parameter of the UAV, in response to receiving the pre-launching signal; and
a processor for determining a launching mode of the UAV according to the at least one detected status parameter of the UAV, and controlling the plurality of rotors to rotate according to the determined launching mode of the UAV, so as to launch the UAV,
wherein the at least one status parameter of the UAV comprises an acceleration of the UAV, and the processor is further configured to perform: comparing the acceleration of the UAV with an acceleration threshold to determine the launching mode of the UAV,
wherein the processor is further configured to perform:
determining the launching mode of the UAV as a hand launching mode, if the acceleration of the UAV is greater than the acceleration threshold; or
determining the launching mode of the UAV as a ground launching mode, if the acceleration of the UAV is smaller than or equal to the acceleration threshold.

* * * * *